(12) United States Patent
Heideman

(10) Patent No.: US 6,915,204 B1
(45) Date of Patent: Jul. 5, 2005

(54) METHOD, SYSTEM, AND ARTICLE OF MANUFACTURE FOR MINIMIZING TRAVEL TIME TO A USER SELECTED LOCATION

(75) Inventor: Michael Heideman, Palo Alto, CA (US)

(73) Assignee: Webraska, Inc., Saratoga, CA (US)

( * ) Notice: Subject to any disclaimer, the term of this patent is extended or adjusted under 35 U.S.C. 154(b) by 435 days.

(21) Appl. No.: 09/588,096

(22) Filed: Jun. 1, 2000

(51) Int. Cl.[7] .............................................. G01C 21/26
(52) U.S. Cl. ...................................................... 701/201
(58) Field of Search ................. 701/117–120, 200–203, 701/207–209, 212–213, 225; 340/988–996; 342/454–458

(56) References Cited

U.S. PATENT DOCUMENTS

| | | | |
|---|---|---|---|
| 4,554,418 A | 11/1985 | Toy ........................ 179/2 DP |
| 4,812,843 A | 3/1989 | Champion, III et al. ..... 340/905 |
| 4,926,336 A | 5/1990 | Yamada ...................... 364/444 |
| 5,122,959 A | 6/1992 | Nathanson et al. ......... 364/436 |
| 5,359,527 A | 10/1994 | Takanabe et al. ........... 364/449 |
| 5,523,950 A | 6/1996 | Peterson ..................... 364/436 |
| 5,559,520 A | 9/1996 | Barzegar et al. ............ 342/357 |
| 5,594,425 A | 1/1997 | Ladner et al. ......... 340/825.06 |
| 5,608,635 A * | 3/1997 | Tamai ........................ 701/209 |
| 5,627,547 A | 5/1997 | Ramaswamy et al. ...... 342/357 |
| 5,627,549 A | 5/1997 | Park ........................... 342/357 |
| 5,729,458 A | 3/1998 | Poppen ..................... 364/464.1 |
| 5,748,107 A | 5/1998 | Kersken et al. ............. 340/905 |
| 5,774,828 A | 6/1998 | Brunts et al. ............... 701/210 |
| 5,802,492 A | 9/1998 | DeLorme et al. ........... 701/200 |
| 5,812,959 A | 9/1998 | Froeburg et al. ............ 701/117 |
| 5,819,201 A | 10/1998 | DeGraaf ..................... 701/208 |
| 5,842,142 A | 11/1998 | Murray et al. ................ 701/16 |
| 5,845,227 A | 12/1998 | Peterson ..................... 701/209 |
| 5,892,454 A | 4/1999 | Schipper et al. ....... 340/825.37 |
| 5,893,081 A | 4/1999 | Poppen ....................... 705/400 |
| 5,906,654 A | 5/1999 | Sato ............................ 701/210 |
| 5,948,040 A | 9/1999 | DeLorme et al. ........... 701/201 |
| 5,960,341 A | 9/1999 | LeBlanc et al. ............ 455/426 |
| 6,021,406 A | 2/2000 | Kuznetsov ..................... 707/6 |
| 6,091,956 A | 7/2000 | Hollenberg ................. 455/456 |
| 6,401,034 B1 * | 6/2002 | Kaplan et al. .............. 701/209 |
| 6,480,783 B1 * | 11/2002 | Myr ............................ 701/117 |
| 2002/0055924 A1 * | 5/2002 | Liming | |

FOREIGN PATENT DOCUMENTS

JP          S62-133600          6/1987

* cited by examiner

Primary Examiner—Thu V. Nguyen
(74) Attorney, Agent, or Firm—Fleiser Meyer LLP

(57) ABSTRACT

A method, system, and article of manufacture for providing a plurality of locations having minimal travel time from a user's location is provided. A user enters a search category into a wireless communication device. The user is then provided with a list of locations having minimal traveling time from the present user's location. Search categories may include, for example, restaurants, theaters, grocery stores, or dry cleaning.

17 Claims, 7 Drawing Sheets

LOCATION 100

RESTAURANT 160

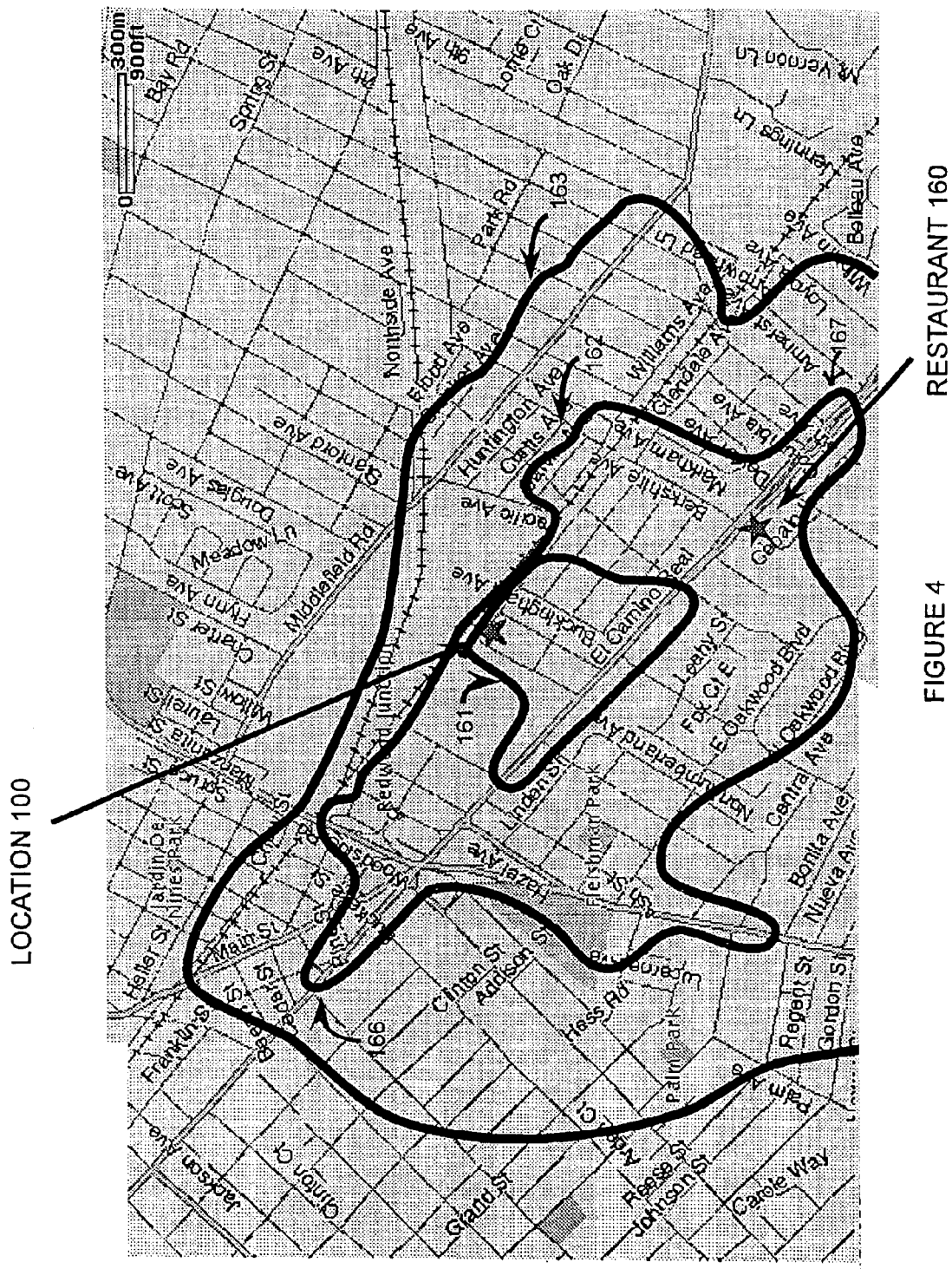

| Restaurant | Address | DriveZone Time in Minutes | DriveZone Distance in Km | Proximity in Km | Proximity Ordering |
|---|---|---|---|---|---|
| FABBROS RESTAURANT | 2915 EL CAMINO REAL | 1.37 | 0.88 | 0.71 | 4 |
| HARRYS HOFBRAU | 1909 EL CAMINO REAL | 1.38 | 1.21 | 0.84 | 7 |
| PAMPAS RESTAURANT | 1836 EL CAMINO REAL | 1.47 | 1.32 | 0.93 | 11 |
| THAI HOUSE RESTAURANT | 1742 EL CAMINO REAL | 1.57 | 1.43 | 1.05 | 12 |
| EL GUANACO MEXICAN | 2950 MIDDLEFIELD RD | 1.62 | 0.82 | 0.58 | 2 |
| LA PACHANGA RESTAURANT | 3102 MIDDLEFIELD RD | 1.77 | 0.95 | 0.77 | 6 |
| EL NOPAL RESTAURANT | 175 5TH AVE | 1.83 | 0.95 | 0.92 | 9 |
| LA ESTRELLITA | 2205 MIDDLEFIELD RD | 1.98 | 1.70 | 0.64 | 3 |
| IXTAPA GRILL | 3143 MIDDLEFIELD RD | 1.98 | 1.14 | 0.87 | 8 |
| LA FORTUNA RESTAURANT | 3180 MIDDLEFIELD RD | 2.03 | 1.21 | 0.93 | 10 |
| WANNS PARTY GIVERS INC | 2684 MIDDLEFIELD RD | 2.07 | 1.00 | 0.38 | 1 |
| EJS STEAK & SEAFOOD | 135 BUCKEYE ST | 2.08 | 1.37 | 0.74 | 5 |
| UNA MAS RESTAURANTS INC | 1023 EL CAMINO REAL | 2.25 | 2.25 | 1.85 | 30 |
| DENNYS RESTAURANT | 1201 BROADWAY ST | 2.27 | 2.19 | 1.32 | 17 |
| HIDEWAY | 739 CHESTNUT ST | 2.32 | 1.98 | 1.11 | 14 |

Figure 6

METHOD, SYSTEM, AND ARTICLE OF MANUFACTURE FOR MINIMIZING TRAVEL TIME TO A USER SELECTED LOCATION

FIELD OF THE INVENTION

The present invention relates to information systems, and in particular, obtaining a user selected type of location having a minimum travel time.

BACKGROUND OF THE INVENTION

Often individuals would like to obtain information regarding local businesses or points of interest. For example, a salesman in the field may be interested in knowing the five closest restaurants from a customer site. The salesman may not be familiar with the area surrounding the customer site.

The salesman would like to reduce his travel time to a particular restaurant in order to keep other appointments. A map or address in a directory may provide the salesman with the closest physical location of a restaurant, but the closest physical restaurant may not be the restaurant having the minimum travel time from the customer site. Also, a map or directory may not be readily accessible or may be outdated. The closest physical restaurant may be on the other side of a river, railroad tracks, or other obstacles. Similarly, the closest physical restaurant may require the use of a particularly congested highway which would increase travel time.

Furthermore, there may be a few restaurants having similar travel times. The salesman may have a preference of one of the restaurants over the other, if they all have similar travel times.

Therefore, it is desirable to provide a system, method, and article of manufacture for providing individuals with user selected types of locations having minimal travel times. The system, method, and article of manufacture should provide a plurality of locations within a user selected category having the shortest travel time from a particular site or origin. The plurality of locations should be updated and quickly accessible which enables the individual to save valuable time and energy while providing informed selections.

SUMMARY OF THE INVENTION

A method for obtaining a minimum travel time to a predetermined destination is provided. A user requests a search category. A plurality of locations in the search category are obtained within a selected area. A first travel time is computed from a first location to a second location in the plurality of locations. The first travel time and respective first location is stored and provided to the user.

According to an embodiment of the present invention, a second travel time is computed from the first location to a third location in the plurality of locations. The first travel time and second travel time are then sorted by ascending order and provided to the user.

According to another embodiment of the present invention, the obtaining step includes searching a database for a plurality of locations within a selected geographical area.

According to another embodiment of the present invention, a method for obtaining a minimum travel time to a plurality of locations in a user selected category is provided. A user requests a search category such as restaurants or dry cleaners. A plurality of locations in the search category within a selected area surrounding the user are selected. A determination is made whether the selected area should be expanded based upon the plurality of locations. A first travel time is estimated by dividing the distance from the first location to the second location by a maximum speed. A determination is made whether the estimated first travel time is less than a predetermined limit. A first travel time is computed from a first location to a second location in the plurality of locations. The first travel time and respective first location is stored. A second travel time is computed from a first location to a third location in the plurality of locations. The first travel time is sorted with the second travel time based upon ascending values.

According to an embodiment of the present invention, a system for obtaining a minimum travel time from an origin to a first location is provided. The system comprises a communication device for inputting a user selected category and receiving a first location, from the user selected category, having the minimum travel time. A transmitter/receiver is coupled to the communication device and receives the user selected category and transmits the first location. A processing device is coupled to the transmitter/receiver and computes the minimum travel time.

According to yet another embodiment of the present invention, an article of manufacture having a computer readable medium for providing a minimum travel time from an origin to a first location in a user selected category is provided. The article of manufacture comprises a first software program for obtaining a user selected category. A second software program obtains a plurality of locations in the user selected category within a predetermined area surrounding the location of the user. A third software program computes the travel time from the user location to the respective plurality of locations. A fourth software program sorts the plurality of locations based on the respective travel times. A fifth software program provides the sorted plurality of locations and respective travel times to the user.

Other aspects and advantages of the present invention can be seen upon review of the figures, the detailed description, and the claims which follow. In the figures, like reference numerals indicate like components.

BRIEF DESCRIPTION OF THE DRAWINGS

FIGS. 2–4 illustrate a map, according to an embodiment of the present invention;

DETAILED DESCRIPTION

Figure 1:
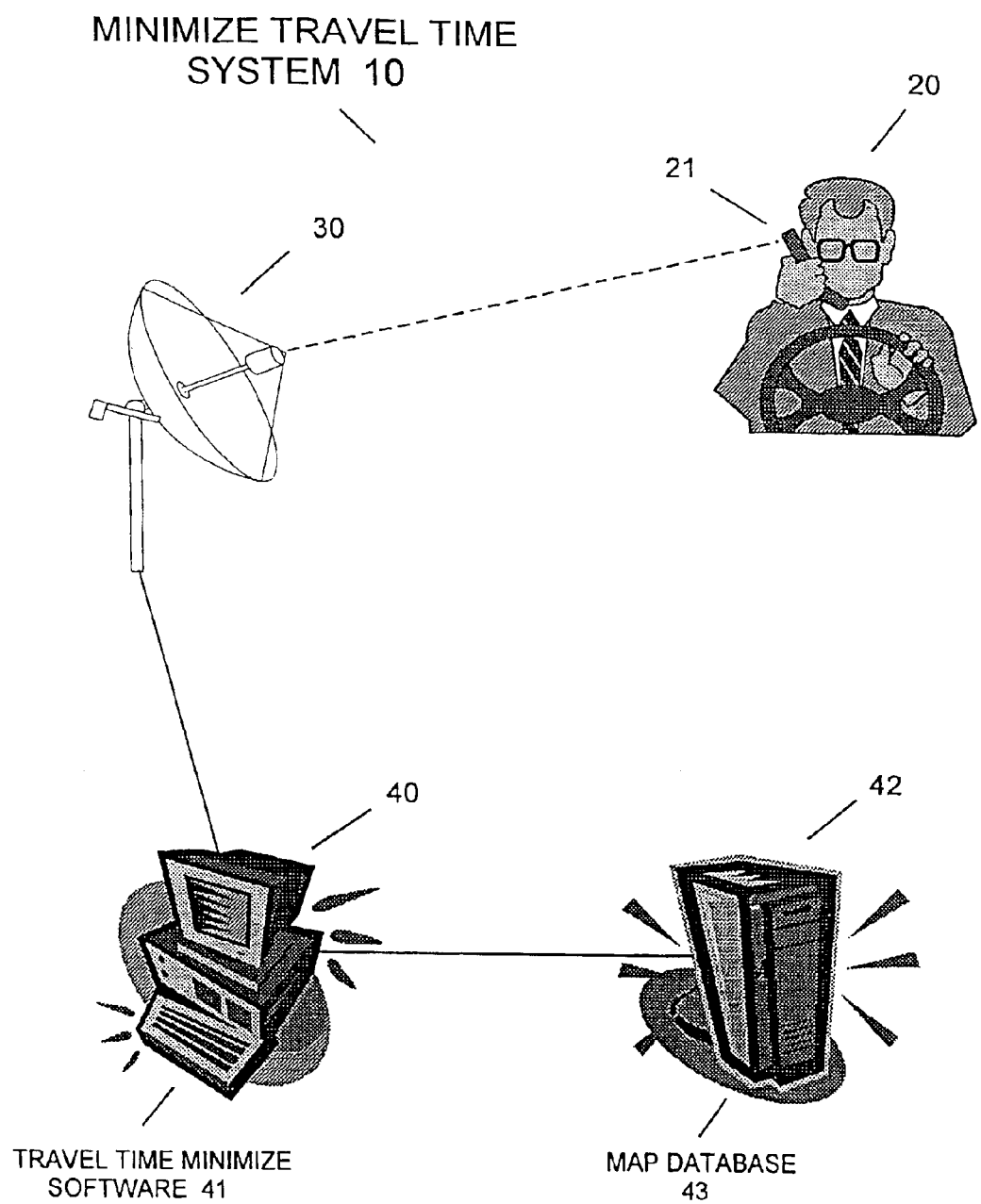
FIG. 1 illustrates a system for minimizing travel time to a user selected type of location according to an embodiment of the present invention.

FIG. 1 illustrates a travel time minimizing system 10 for determining a type of location having the shortest travel time from an origin, according to an embodiment of the present invention. System 10 includes communication device 21. In an embodiment, communication device 21 is a wireless device such as a cellular telephone. In alternate embodiments, communications device 21 may be a personal digital assistant, computer, or equivalent thereof.

In an alternate embodiment, communication device 21 may be wired. For example, communication device 21 is a pay telephone in an alternate embodiment.

A user 20 operates communication device 21 in order to obtain desirable types of locations having the shortest travel time from where user 20 is currently positioned. In an alternate embodiment, a user obtains desirable locations having the shortest travel time from a specified origin which is not necessarily where user 20 is currently positioned.

Communication transmitter/receiver 30 is used to obtain and transmit information to communication device 21. In an embodiment, communication transmitter/receiver 30 is a cellular transmitter/receiver for communicating with a cellular telephone.

Processing device 40 is wired to communication transmitter/receiver 30 in an embodiment of the present invention. In alternate embodiments, processing device 40 is connected to transmitter/receiver 30 by a wireless connection. In an embodiment, processing device 40 is a computer such as a computer server. In alternate embodiments, processing device 40 is a distributed collection of processing devices. In an embodiment, processing device 40 stores travel time minimizing software 41 in processing device memory.

In an alternate embodiment, travel time minimizing software may be stored on a computer readable medium, including but not limited to, a hard disk, a floppy disk, an optical disk or equivalent thereof. In an embodiment, travel time minimizing software is written in the C, C++, or Java™ computer languages, singly or in combination therewith.

Figure 5A:
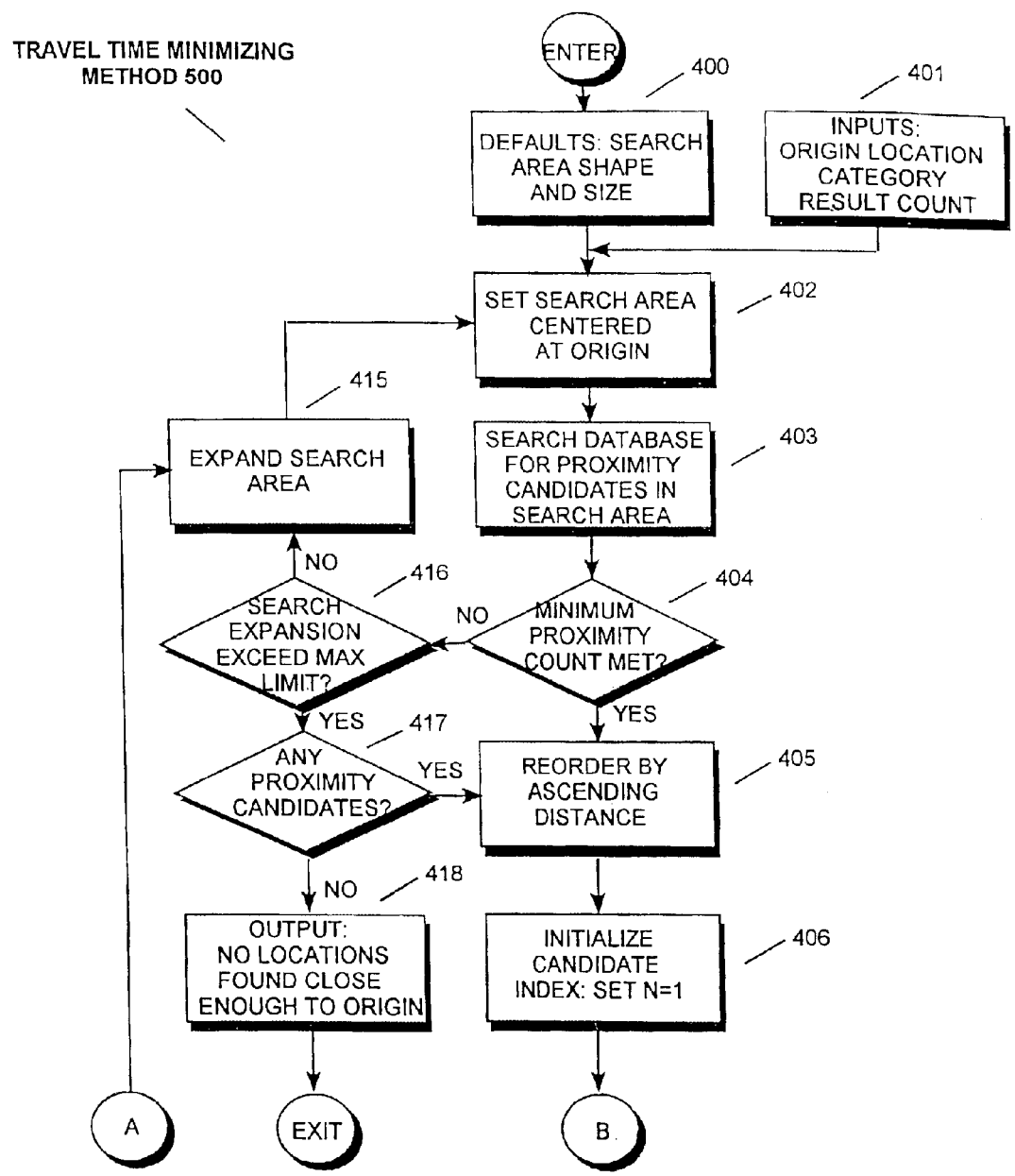
FIGS. 5a–b is a flow chart illustrating a travel time minimizing software program 41 shown in FIG. 1, according to an embodiment of the present invention; and, FIG. 6 is a sorted list of locations in a user selected category ordered by respective ascending travel times from an origin.
Figure 5B:
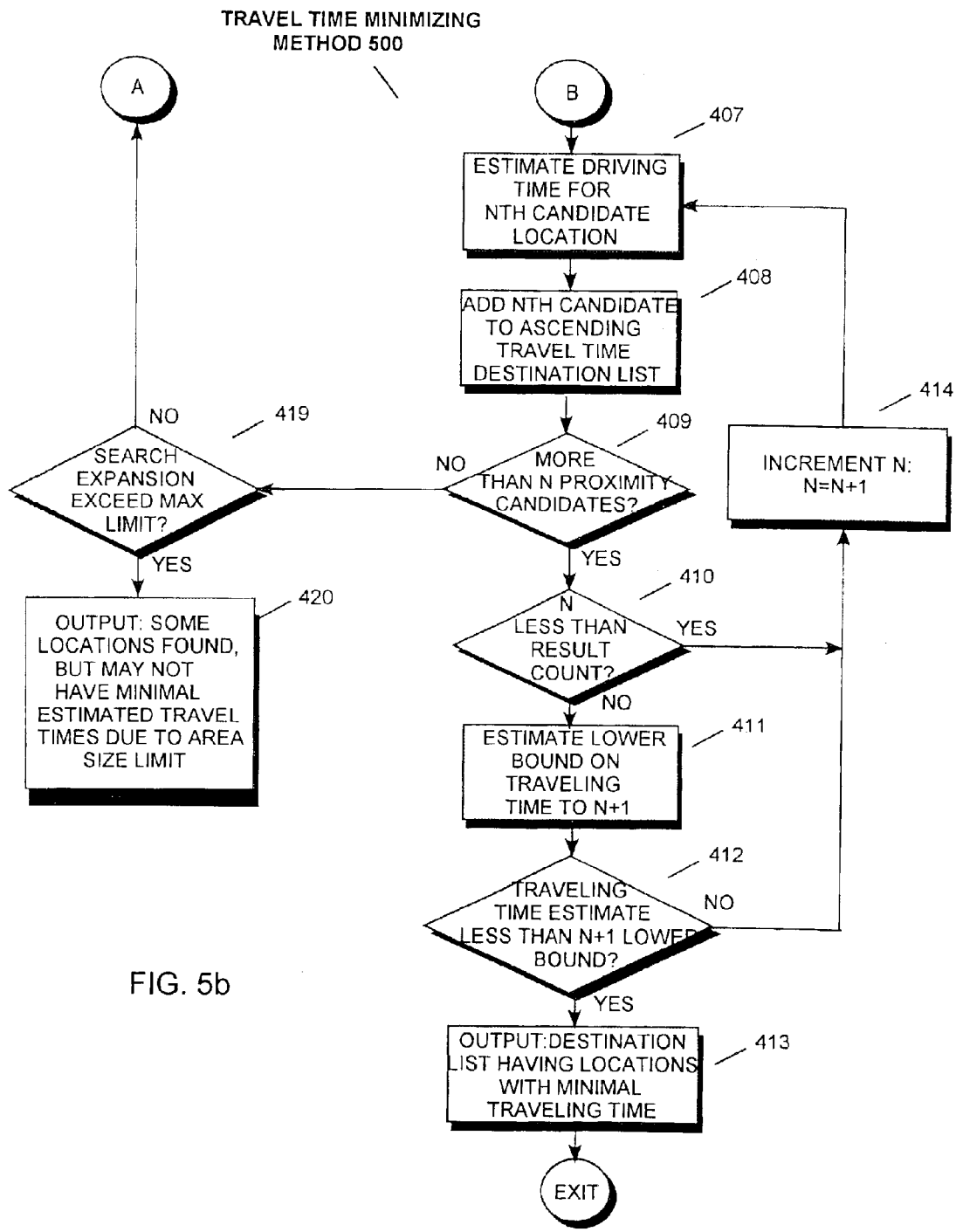

FIGS. 5a–b illustrate the operation of an embodiment of travel time minimizing software 41.

FIG. 6 illustrates an output of travel time minimizing software 41 to communication device 21 in response to a user 20 input.

Processing device 40 is connected to persistence storage 42 which stores maps and other information accessed by software 41. In an embodiment, persistence storage 42 is a large capacity disc drive for storing maps, business locations, and other information accessed by software 41. In alternate embodiments, persistence storage 42 includes multiple storage devices.

Figure 2:
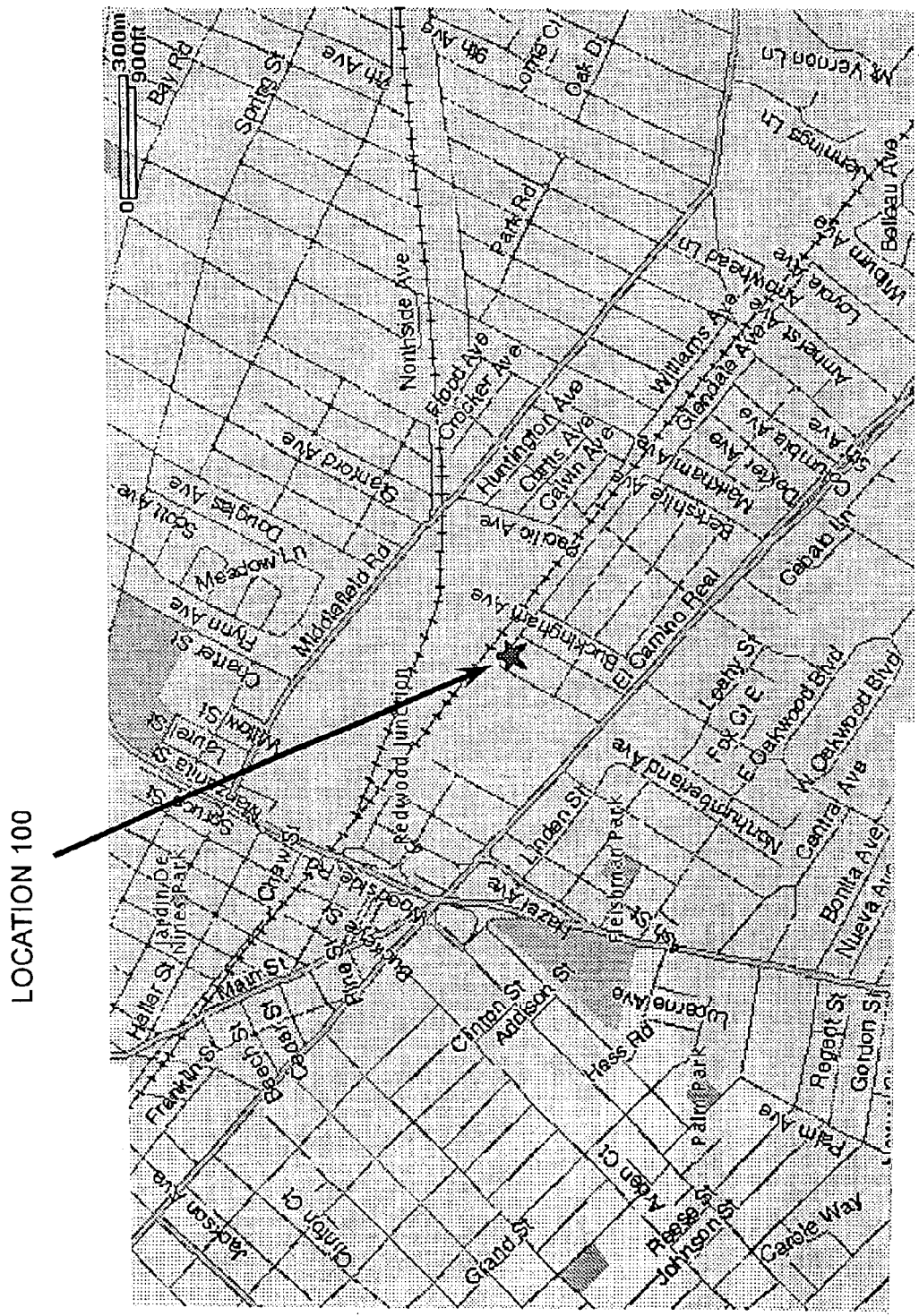
Figure 3:
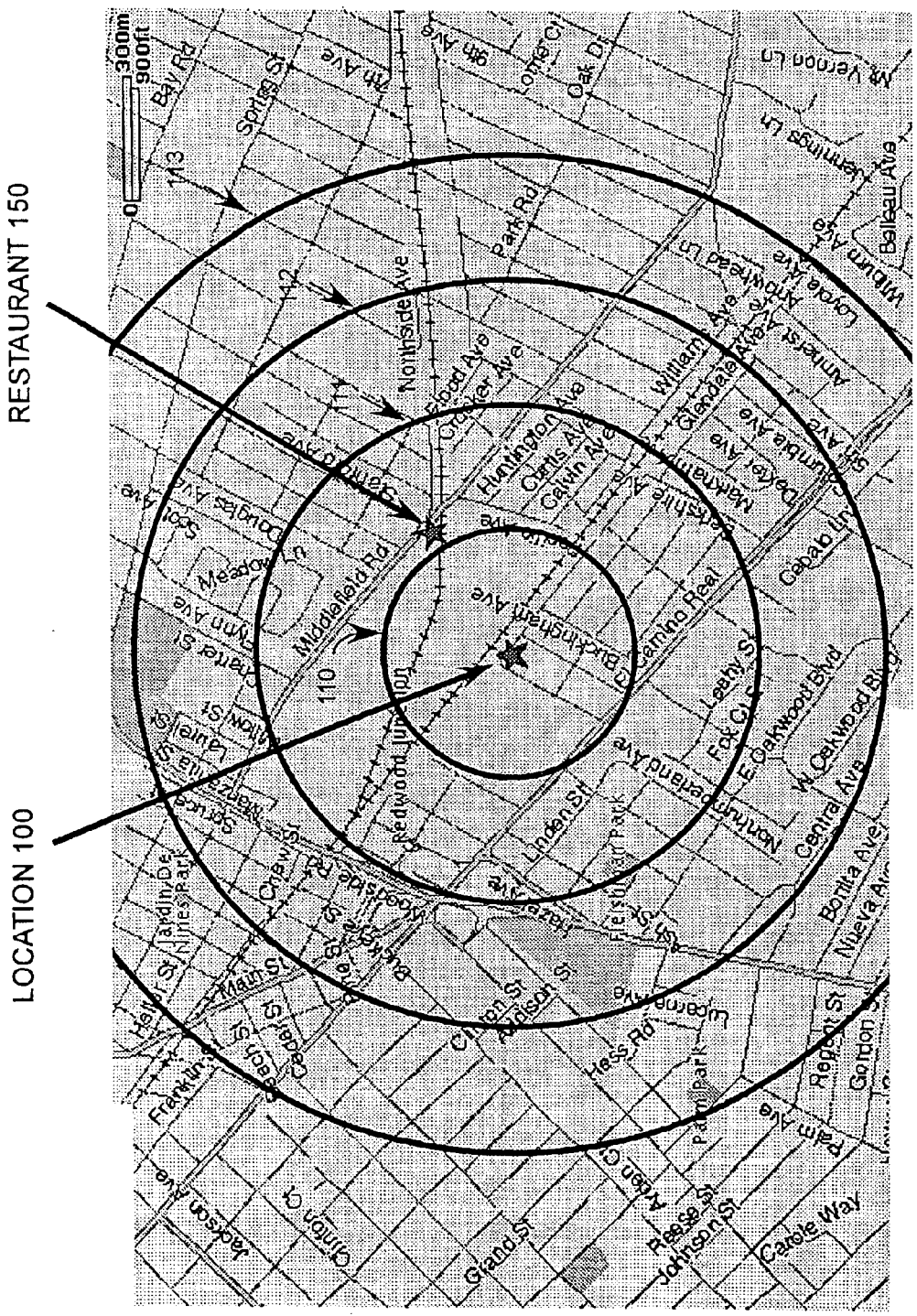

FIGS. 2–4 are maps of a typical urban city. For example, FIG. 2 illustrates freeways, railroads, parks and local roads. User 20 may be at location 100 and interested in knowing where the closest restaurant is located from his current location 100 or origin. In alternate embodiments, user 20 may be interested in the closest dry cleaner, grocery store, retail store, theater, gas station, customer site, tourist site, or any other point of interest. For example, user 20 is interested in knowing the closest restaurant by travel time.

FIG. 3 illustrates how an individual can select a restaurant based on determining the closest physical restaurant from location 100. FIG. 3 illustrates circles 110, 111, 112, and 113 which have radiuses of 300 meters, 600 m, 1.2 km, and 1.8 km from location 100. User 20 then may look on a directory or a map for the closest restaurant falling within the smallest circle. For example, restaurant 150 falls within circle 111 and is approximately 0.38 km away "as the crow flies", or has the closest physical location from location 100. However, as one may observe it may take user 20 a large amount of time to get to restaurant 150. There are two railroad tracks between location 100 and restaurant 150 and user 20 is required to use crossings which may be congested. User 20 could miss important appointments attempting to go to a restaurant which may have been the closest "as the crow flies", but may take a large amount of travel time.

FIG. 4 illustrates zones or areas having businesses or points of interest having minimum travel time from location 100. As can be observed, these zones are not simple circles based on a physical distance between an origin and possible destination. These zones 161, 162, and 163 are determined based on potential pathways or roads user 20 may take to get to a potential destination. The zones are also determined by, but not limited to, the speed limit of a potential pathway, number of turns, and potential traffic congestion. For example, zone 162 has peaks 166 and 167 because user 20 can easily access El Camino Real which has a relatively high speed limit and few turns. In an embodiment of the present invention, the zones may be altered based on traffic congestion and time of day. Using the present method, system, or software, user 20 is able to determine that restaurant 160, which is about 0.71 km away, is actually the restaurant with the minimum travel time as opposed to restaurant 150 which has the closest physical location, but a greater travel time.

FIGS. 5a–b is a flow chart of travel time minimizing software 41 shown in FIG. 1. As one of ordinary skill in the art would appreciate, FIGS. 5a–b show logic blocks for performing specific functions. In alternate embodiments, more or less logic blocks may be used. Similarly, logic blocks may represent software programs, software objects, software subroutines, software code fragments, hardware operations, user operations, singly or in combination.

Travel time minimizing method 500 initiates by inputting or reading a plurality of default values as illustrated by logic block 400 and 401. A default search area shape and size is input in logic block 400. For example, the default search area shape and size may be a bounding box in latitude/longitude of 0.001° on a side. The origin is then entered as illustrated by logic block 401. In an embodiment, the origin may be a user's current location. In an alternate embodiment, the origin may be another location, such as a location at which the user plans to be in the near future. A selection category or criterion is then also entered, as illustrated by logic block 401. In an embodiment, the user category is obtained from a user selecting a category displayed on a cellular telephone display. For example, the user may select the restaurant category displayed on the cellular telephone. A desired result count is then specified by the portal of the users carrier, as illustrated in logic block 401. The desired result count is the number of candidate locations in the selected category to be returned to the user.

Logic block 402 illustrates defining a particular search area or zone. For example, area 161 illustrated in FIG. 4 may be a first zone. In an alternate embodiment, the first zone may be specified by a rectangle. As will be described below, if not enough candidate locations are found in the first zone, the first zone will be expanded into a larger second zone.

A search of database 43 for locations in the selected category and in the defined zone is then performed, as illustrated by logic block 403.

A determination is then made in logic block 404 whether the candidate locations returned by the search of database 43 in logic block 403 meet a threshold number of candidates or minimum proximity candidate count. In an embodiment, a minimum proximity candidate count is 29.

If the minimum proximity candidate count is met, control passes to logic block 405. Otherwise, control passes to logic block 416.

In logic block 416, a determination is made whether an expansion of the search zone will exceed a predetermined limit. For example, a predetermined limit may be the city limits. In an alternate embodiment, the predetermined limit may be user defined. If an expansion of the search zone does not exceed the maximum limit, control passes to logic block 415. In an alternate embodiment, the predetermined limit may be category dependent.

In logic block 415, a search zone is expanded. For example, search zone 161 may be expanded to search zone 162, as illustrated in FIG. 4. In an alternate embodiment, the expanded search zone may be characterized by a rectangle.

After expansion of the search area in logic block 415, control passes to logic block 402 and logic steps may be repeated.

If the expansion of the search area will exceed the maximum limit, a determination is made in logic block 417 whether there are any proximity candidates. If there are proximity candidates, control transitions to logic block 405. Otherwise, the user is notified that no candidate locations are available, as illustrated in logic block 418, and the method 500 exits.

If any proximity candidate exists or the minimum proximity candidate count is met, control transitions to logic block 405.

In logic block 405, the distance from the origin to each proximity candidate is computed. The proximity candidates and their respective distances are sorted by ascending distances.

A candidate index N is then set to 1 as illustrated in logic block 406 in FIG. 6.

In logic block 407, the shortest traveling time between the origin and the Nth proximity candidate is estimated as known by one of ordinary skill in the art.

In logic block 408, the proximity candidate and respective estimated traveling time is added to the destination list in ascending order according to travel time.

A determination is then made in logic block 409 whether there are more than N proximity candidates. If there are not more than N proximity candidates, control transitions to logic block 419 where a determination is made whether a search expansion will exceed the maximum limit. If the maximum limit is not exceeded, control transitions to logic block 415 and the logic blocks are repeated. Otherwise, control transitions to logic block 420 and the user is notified that some locations are found but may not have minimal estimated traveling time due to the search areas default maximum size limit specified in logic block 400.

If there are more than N proximity candidates, control passes to logic block 410.

A determination is made in logic block 410 whether N is less than the desired result count. If N is less than the desired result count, control passes to logic block 414 where N is incremented. Control then transitions to logic block 407 where the logic blocks may be repeated. If N is not less than the desired result count, control passes to logic block 411.

An estimated lower bound traveling time is estimated in logic block 411. The estimated lower bound traveling time is estimated by dividing the proximity distance from the origin to the N+1 candidate by the maximum speed. If the search area is not circular, then it is also necessary to determine whether the search area fully contains a circle of radius equal to the distance to the candidate. This estimation is done in order to prevent unnecessary computation of a traveling time which would not provide a proximity candidate with a shorter traveling time than already calculated. This allows for enhanced speed in providing information to users.

A determination in logic block 412 is made whether the driving time to the selected result count candidate in ascending order by traveling time is less than the calculated lower bound traveling time. If the traveling time to the selected result count candidate in ascending order is less than the lower bound, control passes to logic block 413 where the destination list of proximity candidates from a user selected category is output to the user. In an embodiment, the list may be displayed or provided by an audio list. Method 500 then exits.

If the traveling time to N is not less than the computed lower bound, control passes to logic block 414 where N is incremented. Control then transitions to logic block 407 where the steps are repeated.

FIG. 6 illustrates a list of locations from a user selected category having minimal traveling time from an origin. The list of locations is provided in ascending travel time order and is provided by travel time minimizing software 41.

Column 500 lists candidate restaurants near an origin, such as location 100 in FIG. 2. Column 501 lists the addresses of respective restaurants in column 500. Column 502 lists in ascending order the calculated travel time to the respective restaurants in column 500.

For example, "Harry's Hofbrau" takes approximately 1.38 minutes travel time from location 100, while the "Denny's Restaurant" takes 2.27 minutes travel time.

Column 503 lists distances to the respective restaurants in column 500 using the roads as illustrated in FIG. 2. Column 504 lists the proximity distance or "as the crow flies" distance to the respective restaurants.

Finally, column 505 lists the proximity order of the respective restaurants or the ranking of the restaurants based on the proximity distance to the restaurant from location 100. Note that certain restaurants may have a very low proximity rank, yet a very high travel time. The $11^{th}$ closest restaurant by proximity ("Pampas Restaurant") turns out to be the $3^{rd}$ closest by travel time. Conversely, the $1^{st}$ closest restaurant by proximity "Wanns Party Givers, Inc." is the $11^{th}$ closest by travel time.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for obtaining a travel time, comprising the steps of:
   receiving at a remote location a search category from a communication device;
   identifying a plurality of locations in the search category which are within a search area, wherein the search area is determined based upon selected potential pathways located around an origin, the potential pathways being selected based upon characteristics of each of the potential pathways, including but not limited to speed limit, number of turns, and potential traffic congestion;
   computing a first travel time from the origin to a first location in the plurality of locations;
   storing the first travel time and respective first location; and transmitting the first location and the first travel time from the remote location to the communication device;

wherein the communication device is one of a telephone and a personal digital assistant.

2. The method of claim 1, further comprising the steps of:

computing a second travel time from the origin to a second location in the plurality of locations; and, sorting the first travel time and second travel time by ascending order.

3. The method of claim 1, wherein the search category is restaurants and the first location is a first restaurant.

4. The method of claim 1, wherein the search category is gas stations and the first location is a gas station.

5. The method of claim 1, further comprising the step of expanding the search area.

6. The method of claim 1, further comprising the step of:

determining whether a preselected number of locations have respective travel times computed.

7. The method of claim 1, further comprising the steps of:

estimating the first travel time by dividing a distance from the origin to the first location by a maximum speed; and, determining whether the estimated first time is less than a predetermined limit.

8. The method of claim 1, wherein the identifying step includes searching a database for a plurality of locations within a selected geographical area.

9. The method of claim 1, wherein the communication device is a cellular telephone.

10. A method for obtaining a travel time, comprising the steps of:

receiving at a remote location a search category from a communication device;

identifying a plurality of locations in the search category which are within a search area, wherein the search area is determined based upon selected potential pathways located around an origin, the potential pathways being selected based upon characteristics of each of the potential pathways, including but not limited to speed limit, number of turns, and potential traffic congestion;

determining whether the search area should be expanded based upon the plurality of locations;

estimating a first travel time by dividing the distance from the origin to a first location by a maximum speed;

determining whether the estimated first travel time is less than a predetermined limit;

computing the first travel time from the origin to the first location in the plurality of locations;

storing the first travel time and respective first location;

computing a second travel time from the origin to a second location in the plurality of locations;

sorting the first travel time with the second travel time based upon ascending values;

compiling a list from the sorted first travel time and second travel time, the list including travel time and location address; and transmitting the list from the remote location to the communication device;

wherein the communication device is one of a telephone and a personal digital assistant.

11. A method for obtaining a list of targets, comprising the steps of:

receiving a request for a search category from a communication device;

identifying a plurality of locations in the search category which are within a search area, wherein the search area is determined based upon selected potential pathways located around an origin, the potential pathways being selected based upon characteristics of each of the potential pathways, including but not limited to speed limit, number of turns, and potential traffic congestion;

identifying a plurality of targets in the search category which are within the search area;

computing a travel time for at least one of the plurality of targets from the origin to the target;

sorting each of the plurality of targets for which a travel time has been computed by the respective travel time;

compiling a list of the sorted plurality of targets; and displaying the list to a user via the communication device;

wherein the communication device is one of a telephone and a personal digital assistant.

12. The method of claim 11, wherein the search category is restaurants.

13. The method of claim 11, wherein the search category is gas stations.

14. The method of claim 11, further comprising the step of modifying the search area.

15. The method of claim 11, further comprising the step of:

estimating whether a travel time is less than a predetermined limit by dividing a distance from the origin to the target by a maximum speed.

16. The method of claim 11, wherein the identifying step includes searching a database for a plurality of targets within the search area.

17. The method of claim 11, wherein the communication device is a cellular telephone.

* * * * *